United States Patent [19]

Cooke et al.

[11] Patent Number: 5,425,121
[45] Date of Patent: Jun. 13, 1995

[54] CABLE ASSEMBLY FOR USE WITH OPTO-ELECTRONIC EQUIPMENT ENCLOSURES

[75] Inventors: Terry L. Cooke; David H. Mutzabaugh, both of Hickory, N.C.

[73] Assignee: Siecor Corporation, Hickory, N.C.

[21] Appl. No.: 190,757

[22] Filed: Feb. 2, 1994

[51] Int. Cl.⁶ .............................................. G02B 6/44
[52] U.S. Cl. .................................................. 385/112
[58] Field of Search ........................ 385/109, 112, 147

[56] References Cited

U.S. PATENT DOCUMENTS

| | | | |
|---|---|---|---|
| 4,230,395 | 10/1980 | Dean et al. | 385/109 |
| 4,932,746 | 6/1990 | Calzolari et al. | 385/112 |
| 5,245,134 | 9/1993 | Vana, Jr. et al. | 385/112 |
| 5,271,081 | 12/1993 | Khalil | 385/112 |
| 5,289,556 | 2/1994 | Rawlyk et al. | 385/112 |

OTHER PUBLICATIONS

Siecor Recommended Procedure SRP-000-082 Issue 3, Jul. 1993.
Alcoa Fujikura Instruction Manual 436-652-000.
Jerrold Communications Installation Manual 436-58-4-200.

Primary Examiner—Akm E. Ullah
Attorney, Agent, or Firm—J. David Abernethy

[57] ABSTRACT

Light, flexible tubes are placed around optical fibers extending from the end of a cable jacket. A water impervious plug encases the end of the cable jacket and a portion of the flexible tubes. Couplers are attached to the light waveguide terminal ends and the optical couplers and the plug are placed in an opto-electronic equipment closure. The assembly is designed for use with cable television system aerial closures.

4 Claims, 5 Drawing Sheets

CABLE ASSEMBLY FOR USE WITH OPTO-ELECTRONIC EQUIPMENT ENCLOSURES

BACKGROUND OF THE INVENTION

The field of the invention is optical cable assemblies.

Background of the Invention. There are several disadvantages associated with the current practices for installation, termination, and environmental sealing of fiber optic cables placed into cable television system electronic equipment enclosures. A prior art practice is to strip back the end of a fiber optic cable and feed the exposed coated optical fibers into the fiber optic entry point of an electronic closure. A threaded connector on the cable is screwed into the entry port. The connector, after tightening, grips the fiber optic cable jacket for strain relief. The exposed fibers are then fusion spliced inside the enclosure. No additional protection is provided for the fibers, no mechanism is provided to control core pistoning into the enclosure, and no mechanism is provided to block the migration of water from entering the electronic enclosure if the cable sheath is damaged behind the strain relief connector. The current method is also labor intensive and costly to the cable television company.

SUMMARY OF THE INVENTION

The invention solves the foregoing problems by pre-connectorizing the optical fiber terminal ends, protecting the exposed optical fibers with flexible tubing, and sealing the assembly by providing a plug around the end of the cutback cable jacket through which moisture might otherwise enter. A jacketed cable includes a plurality of light waveguides. The plurality of light waveguides includes a proximal span included within the jacketed cable, a distal end to which an optical coupler is affixed, and a mediate span therebetween. A plurality of flexible tubes is provided, each flexible tube surrounding a mediate span of one of the said light waveguides. A water impervious plug encases a portion of the mediate span of the plurality of light waveguides, the plug extending onto and over a portion of the cable jacket. The optical couplers and the plug are placed in an opto-electronic equipment enclosure. A prior art threaded connector mounts the cable to the entry port of the closure and is surrounded by a watertight seal. The equipment closure may be an aerial closure which is part of a cable television system.

BRIEF DESCRIPTION OF THE DRAWINGS

The preferred embodiment is described with the aid of the drawings, in which.

DETAILED DESCRIPTION OF THE PREFERRED EMBODIMENT

Figure 1:
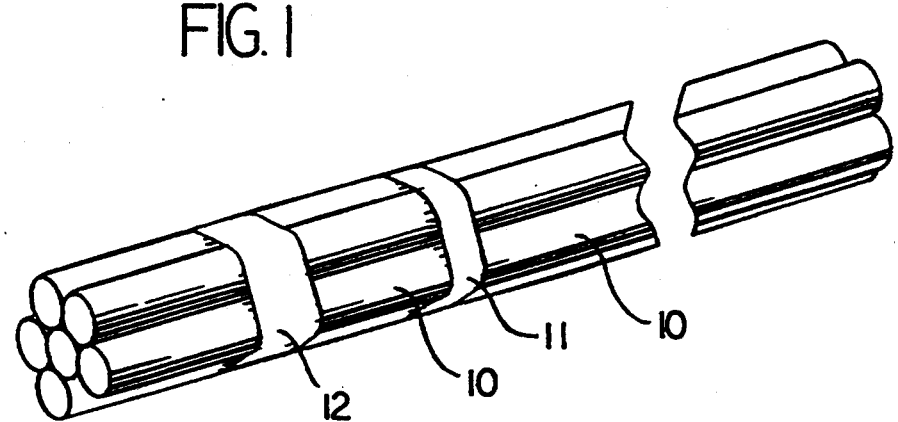
FIGS. 1 and 2 are perspective views of portions of a plurality of bundled flexible tubes.
Figure 2:
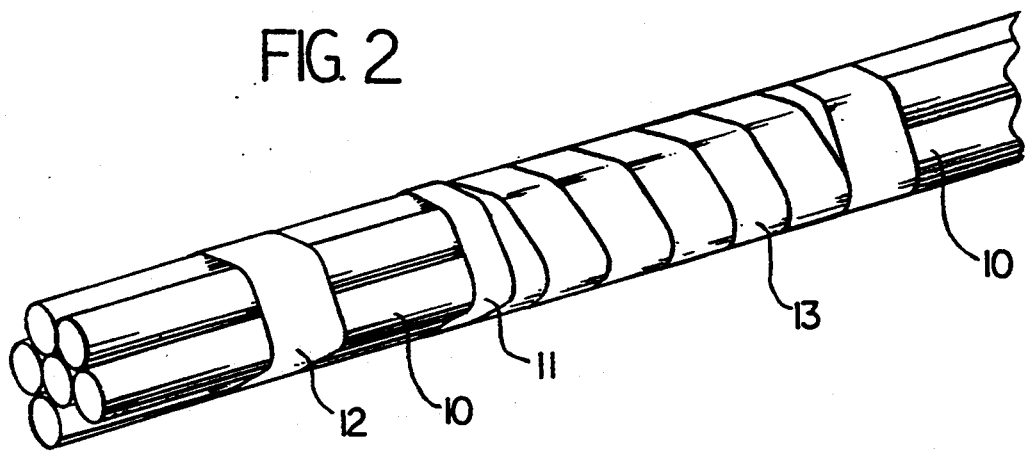

An array of flexible tubes 10 are bundled as shown in FIG. 1 by two strips 11, 12 of heat shrinkable material which are preferably ¼ inch wide. Tubes 10 are preferably made of a lightweight, low friction, highly flexible plastic such as Teflon ® plastic. Strips 11, 12 are placed 3/16th of an inch apart. Strip 12 is located around ¼ inch from one end of tubes 10.

After strips 11, 12 have cooled, spiral wrap material 13 is placed over the bundle of tubes 10, with one edge over strip 11 and the remainder proceeding in the direction opposite strip 12.

Figure 3:
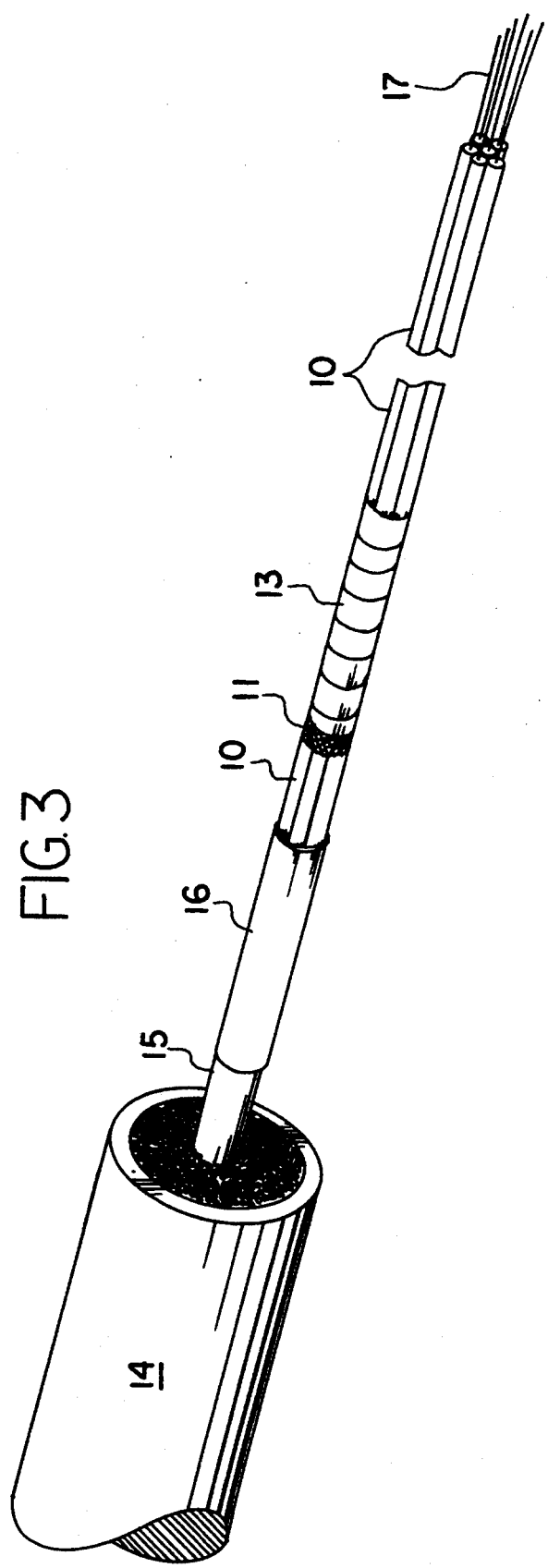
FIG. 3 is a perspective view of the assembly prior to formation of the sealed plug.
Figure 4:
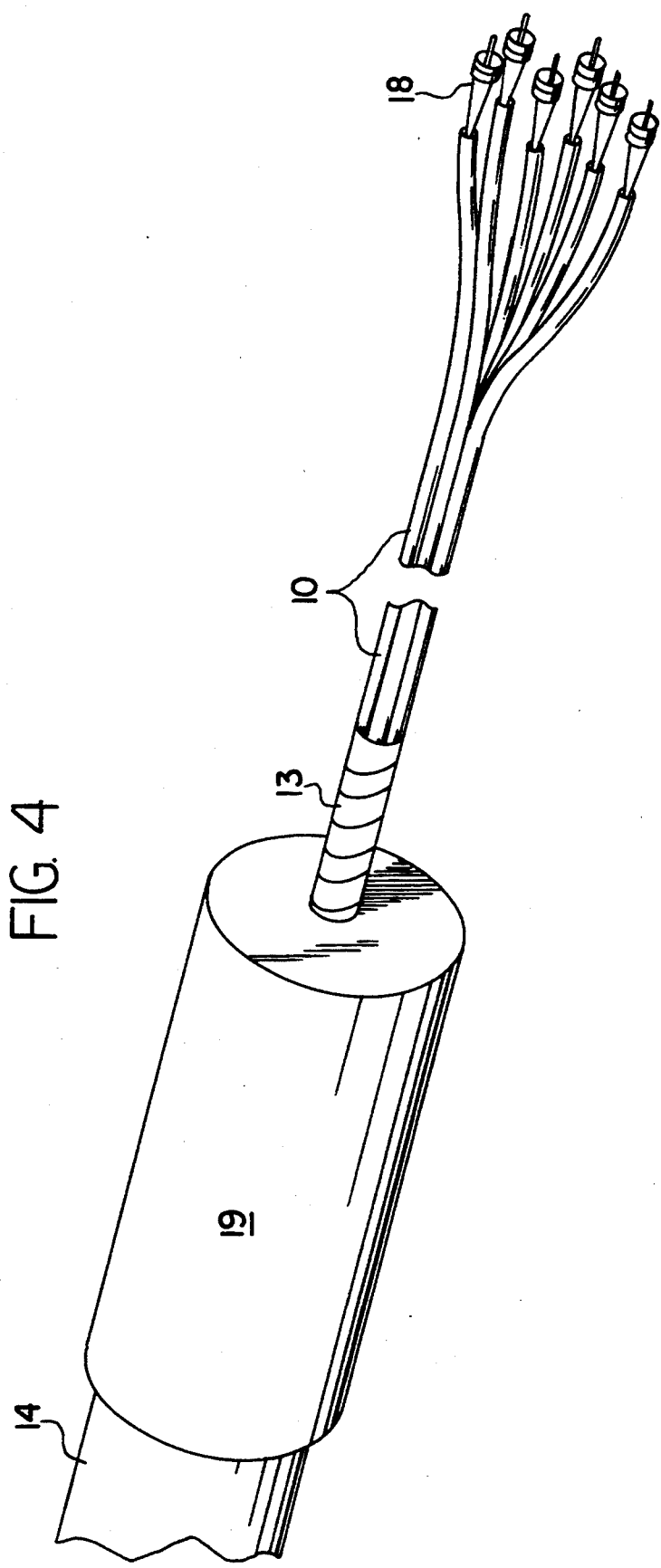
FIG. 4 is a perspective view of the assembly including the sealed plug and the attached optical couplers.

A light waveguide cable is then prepared as shown in FIG. 3. After one end of cable jacket 14 has been cut back, a buffer tube 15 including light waveguides 17 extends a short distance. Each fight waveguide 17 is threaded through a flexible tube 10, with an optical coupler 18 being placed on the distal end of each fight waveguide 17. As shown in FIG. 4, tubes 10 extend to meet the rear of couplers 18. A protective boot on each coupler 18 may cover the end of a tube 10. After one end of tubes 10 have been placed inside buffer tube 15, an adhesive fined piece of heat shrinkable material 16 is placed over the junction of buffer tube 15 and flexible tubes 10. Heat is then applied to produce the configuration of FIG. 3.

The assembly of FIG. 3 is then placed in a mold such that the end of cable jacket 14 lies at one end of the mold and spiral wrap material 13 and tubes 10 extend from the other end of the mold. After O-rings are placed at the ends of the mold, an epoxy is injected into the mold to produce a cylindrical water impervious plug 19, which has a constant outer diameter of slightly less than ⅝ inch. Aramid fibers or other strength members extending slightly from the edge of cable jacket 14 into the mold provide strain relief for the cable assembly. After molding, the assembly has the appearance as shown in FIG. 4.

Figure 5:
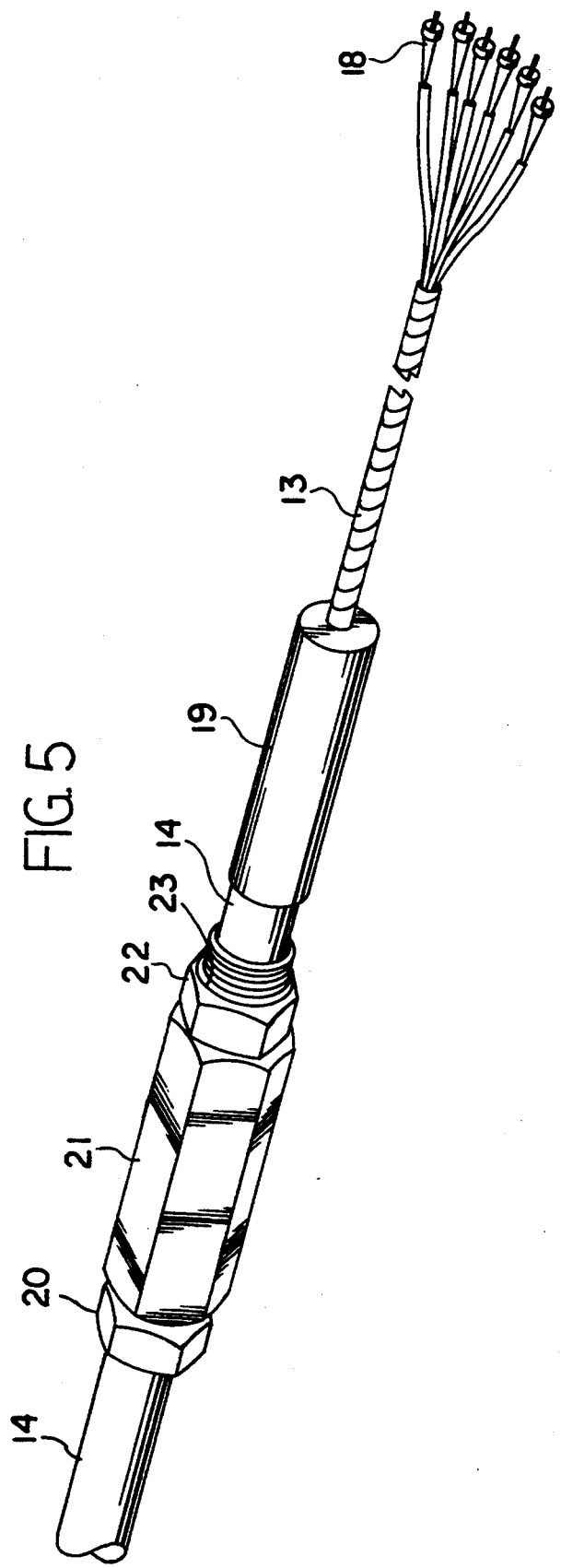
FIG. 5 is a perspective view of the assembly including the threaded metallic strain relief connector.

FIG. 5 depicts the threaded metal connector used to anchor the cable assembly to the optical entry port of an opto-electronic closure. Connector components include back nut 20, main body 21, and entry nut 22 having external threads 23 thereon, all of which are inserted over cable jacket 14 prior to molding plug 19 if desired. O-rings are provided for each nut 20, 22.

Figure 6:
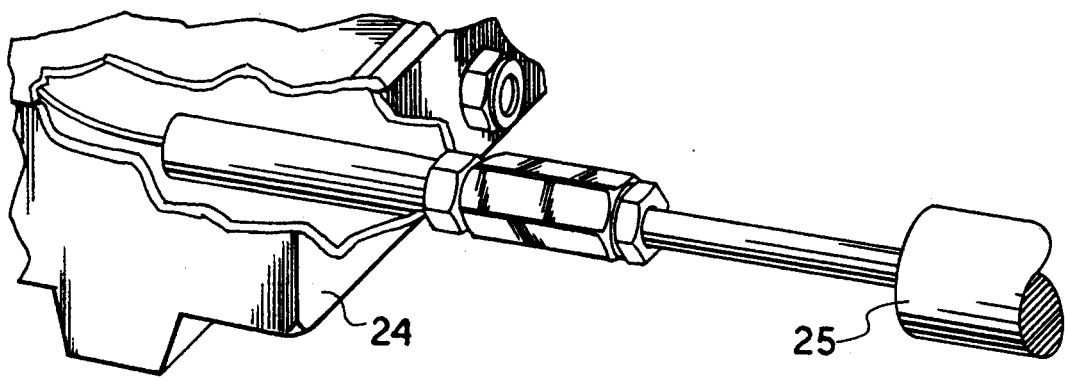
FIG. 6 is a perspective view of the assembly as inserted into an electronic closure.
Figure 7:
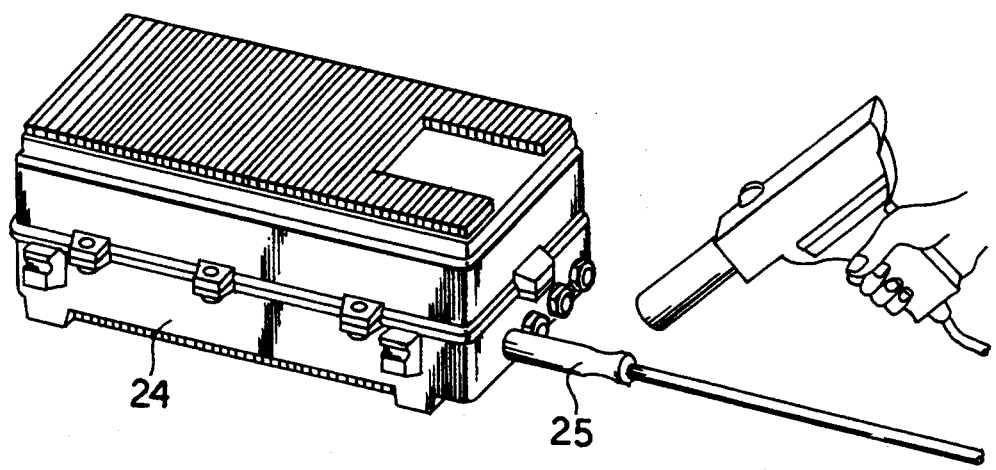
FIG. 7 is a perspective view of a heat shrinkable tubing applied over the assembly as it enters the outside of the enclosure.

The assembly is shown in FIG. 6 as inserted through the optical entry port of an opto-electronic aerial closure 24, which is part of a cable television network system. Both plug 19 and couplers 18 are inserted into closure 24 through the optical entry port, which has a standard diameter of ⅝ inch. The plug outer diameter must be smaller than the inner diameter of the optical entry port. Plug 19 is pulled snugly against the edge of enclosure 24, and entry nut 22 is screwed into the inner threaded entry port of the enclosure. Main body 21 and rear nut 20 are then tightened against entry nut 22. A further piece of heat shrinkable tubing 25, having previously been placed over the edge of cable jacket 14, is then moved forward over the metallic connector and heated as shown in FIG. 7 to provide a sealed junction of the assembly with closure 24. In this manner, light waveguides 17 are protected throughout their length, including proximal spans included within cable jacket 14, their distal ends to which couplers 18 are attached, and the mediate span of each optical fiber 17 located therebetween.

What is claimed is:

1. A cable assembly for use with opto-electronic equipment enclosures, comprising:
   a plurality of light waveguides, each light waveguide including a proximal span in which the light waveguide is loosely held within a tube within a cable having an outer jacket, a distal end to which an optical coupler is affixed, and a mediate span not enclosed by the outer cable jacket therebetween;
   a plurality of flexible tubes, each said flexible tube surrounding a mediate span of one of the said light waveguides; and,
   a water-impervious plug of constant outer diameter encasing a portion of the mediate span of the plurality of light waveguides and flexible tubes, the plug extending to and over a portion of the cable jacket.

2. A cable assembly as recited in claim 1 further comprising an opto-electronic equipment closure having an optical entry port of constant inner diameter greater than the plug outer diameter, the closure containing the optical couplers and the plug, and sealed means for attaching the cable to the closure.

3. A cable assembly as recited in claim 2 wherein the closure is an aerial closure which is part of a cable television system.

4. A cable assembly as recited in claim 2 wherein the plug outer diameter is less than five-eights of an inch.

* * * * *